United States Patent
Xu (10) Patent No.: US 10,691,982 B2
(45) Date of Patent: *Jun. 23, 2020

(54) METHOD AND APPARATUS FOR VEHICLE DAMAGE IDENTIFICATION

(71) Applicant: Alibaba Group Holding Limited, George Town, Grand Cayman (KY)

(72) Inventor: Juan Xu, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,549

(22) Filed: Jan. 30, 2020

(65) Prior Publication Data

US 2020/0167594 A1 May 28, 2020

Related U.S. Application Data

(63) Continuation of application No. 16/572,928, filed on Sep. 17, 2019.

(30) Foreign Application Priority Data

Sep. 18, 2018 (CN) .......................... 2018 1 1089438

(51) Int. Cl.
*G06K 9/00* (2006.01)
*G06K 9/62* (2006.01)
*G06T 7/11* (2017.01)

(52) U.S. Cl.
CPC ................ *G06K 9/627* (2013.01); *G06T 7/11* (2017.01); *G06T 2207/20081* (2013.01);
(Continued)

(58) Field of Classification Search
CPC . G06K 9/627; G06T 7/11; G06T 2207/30252; G06T 2210/12; G06T 2207/20084; G06T 2207/20081
(Continued)

(56) References Cited

U.S. PATENT DOCUMENTS

2015/0242686 A1* 8/2015 Lenka ..................... G06F 16/51
382/103
2017/0293894 A1* 10/2017 Taliwal ................. G06T 7/0004
(Continued)

FOREIGN PATENT DOCUMENTS

WO   WO 2013/093932 A2    6/2013
WO   WO-2013093932 A2 *   6/2013 ............. G06T 7/001
(Continued)

OTHER PUBLICATIONS

International Search Report and Written Opinion dated Nov. 11, 2019, in counterpart International Application No. PCT/US2019/051229.

*Primary Examiner* — Van D Huynh
(74) *Attorney, Agent, or Firm* — Finnegan, Henderson, Farabow, Garrett & Dunner, L.L.P.

(57) ABSTRACT

A method for vehicle damage identification, includes: obtaining a vehicle damage picture to be identified; inputting the vehicle damage picture into a plurality of pre-trained target detection models respectively, and obtaining corresponding detection results from the plurality of target detection models as a detection result set, wherein the detection result set comprises candidate bounding boxes detected by the plurality of target detection models and category prediction results of the candidate bounding boxes; determining an integrated feature vector of a first candidate bounding box of the candidate bounding boxes; and separately inputting integrated feature vectors corresponding to the candidate bounding boxes into a pre-trained classification model, and optimizing the detection result set according to output results of the classification model.

20 Claims, 7 Drawing Sheets

(52) U.S. Cl.
CPC ............... *G06T 2207/20084* (2013.01); *G06T 2207/30252* (2013.01); *G06T 2210/12* (2013.01)

(58) Field of Classification Search
USPC ........................................................ 382/155
See application file for complete search history.

(56) References Cited

U.S. PATENT DOCUMENTS

| | | | |
|---|---|---|---|
| 2018/0121762 A1* | 5/2018 | Han | G06K 9/4604 |
| 2018/0260793 A1* | 9/2018 | Li | G06Q 10/20 |
| 2019/0095877 A1* | 3/2019 | Li | G06K 9/00771 |
| 2019/0130189 A1* | 5/2019 | Zhou | G06K 9/00771 |
| 2019/0303686 A1* | 10/2019 | Guo | G06K 9/00785 |
| 2020/0026956 A1* | 1/2020 | Kumar | G06K 9/627 |
| 2020/0034958 A1* | 1/2020 | Campbell | G06Q 10/10 |

FOREIGN PATENT DOCUMENTS

| | | | | |
|---|---|---|---|---|
| WO | WO 2017/079972 A1 | 5/2017 | | |
| WO | WO-2017079972 A1 * | 5/2017 | ........... | G06K 9/6256 |

* cited by examiner

METHOD AND APPARATUS FOR VEHICLE DAMAGE IDENTIFICATION

CROSS-REFERENCE TO RELATED APPLICATIONS

This application is a continuation of U.S. application Ser. No. 16/572,928, filed on Sep. 17, 2019, which is based upon and claims priority to Chinese Patent Application No. 201811089438.8, filed on Sep. 18, 2018, the entire content of both of which is incorporated herein by reference.

TECHNICAL FIELD

The present application relates to the field of machine learning, and more particularly, to a method and an apparatus for vehicle damage identification using machine learning.

TECHNICAL BACKGROUND

In a traditional vehicle insurance claim settlement scenario, an insurance company needs to send professional survey and damage assessment personnel to a scene of an accident to conduct an on-site survey and damage assessment, propose a vehicle's repair plan and compensation amount, take photos of the scene, and record the damage assessment photos for damage and compensation check by off-site inspectors. Due to the need for manual survey and damage assessment, the insurance company needs to invest a lot of labor costs and professional training costs. In terms of the experience of ordinary users, they have to wait for a manual surveyor to take pictures on the spot, a damage assessor to assess damage at a repair location, and a damage inspector to conduct a damage check during the claim settlement process. Therefore, the claim settlement period takes up to 1-3 days, the user waiting time is long, and the user experience is poor.

In view of the above, the inventors apply artificial intelligence and machine learning to the scene of damage assessment for a vehicle, and use the computer vision image identification technology in the field of artificial intelligence to automatically recognize, according to on-site damage pictures taken by ordinary users, the vehicle damage status reflected in the pictures, and automatically provide a repair plan. Therefore, manual surveys, damage assessments, and checks in the traditional vehicle insurance claim settlement scenario are not required, which could greatly reduce insurance company costs and improve the vehicle insurance claim settlement experience of users.

Moreover, the accuracy of damage identification in current intelligent damage assessment solutions needs to be further improved. Therefore, an improved solution is also desired for further optimizing vehicle damage detection results and improving identification accuracy.

SUMMARY

Embodiments of the present specification provide a method and apparatus for vehicle damage identification, wherein a plurality of target detection models are used to perform detection on a to-be-identified picture and obtain a plurality of candidate bounding boxes, and then detection results are optimized based on association relationships between the candidate bounding boxes to improve the accuracy of damage identification.

According to an embodiment, a method for vehicle damage identification includes: obtaining a vehicle damage picture to be identified; inputting the vehicle damage picture into a plurality of pre-trained target detection models respectively, and obtaining corresponding detection results from the plurality of target detection models as a detection result set, wherein the detection result set includes candidate bounding boxes detected by the plurality of target detection models and category prediction results of the candidate bounding boxes; determining an integrated feature vector of a first candidate bounding box of the candidate bounding boxes based on an association relationship between the first candidate bounding box and other candidate bounding boxes, wherein the association relationship includes at least one of: a bounding box content association relationship, a location association relationship, or a category prediction result association relationship; and separately inputting integrated feature vectors corresponding to the candidate bounding boxes into a pre-trained classification model, and optimizing the detection result set according to output results of the classification model.

According to an embodiment, an apparatus for vehicle damage identification includes: a processor; and a memory configured to store instructions, wherein the processor is configured to execute the instructions to: obtain a vehicle damage picture to be identified; input the vehicle damage picture into a plurality of pre-trained target detection models respectively, and obtain corresponding detection results from the plurality of target detection models as a detection result set, wherein the detection result set includes candidate bounding boxes detected by the plurality of target detection models and category prediction results of the candidate bounding boxes; determine an integrated feature vector of a first candidate bounding box of the candidate bounding boxes according to an association relationship between the first candidate bounding box and other candidate bounding boxes, wherein the association relationship includes at least one of: a bounding box content association relationship, a location association relationship, or a category prediction result association relationship; and separately input integrated feature vectors corresponding to the candidate bounding boxes into a pre-trained classification model, and optimize the detection result set according to output results of the classification model.

According to an embodiment, a non-transitory computer-readable medium having stored therein instructions that, when executed by a processor of a device, cause the device to perform a method for vehicle damage identification. The method includes: obtaining a vehicle damage picture to be identified; inputting the vehicle damage picture into a plurality of pre-trained target detection models respectively, and obtaining corresponding detection results from the plurality of target detection models as a detection result set, wherein the detection result set includes candidate bounding boxes detected by the plurality of target detection models and category prediction results of the candidate bounding boxes; determining an integrated feature vector of a first candidate bounding box of the candidate bounding boxes based on an association relationship between the first candidate bounding box and other candidate bounding boxes, wherein the association relationship includes at least one of: a bounding box content association relationship, a location association relationship, or a category prediction result association relationship; and separately inputting integrated feature vectors corresponding to the candidate bounding boxes into a pre-trained classification model, and optimizing the detection result set according to output results of the classification model.

According to the embodiments, on one hand, multiple target detection models are used at the same time to perform damage identification and detection on a vehicle damage picture, which makes generated detection results complement each other, and therefore reduces the possibility of missed detection to the greatest extent. Further, for the N candidate bounding boxes obtained by the plurality of target detection models, based on the association relationship between each candidate bounding box and other candidate bounding boxes, a connection is established between the candidate bounding boxes, and based on such a connection, a trained classification model is further used to determine the accuracy of each candidate bounding box, thereby eliminating bounding boxes of false detection and further optimizing the damage identification result. In this way, the accuracy of damage identification can be comprehensively improved.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

In order to identify damage in a picture for vehicle damage assessment, a method commonly used in the industry is to determine the damaged components in a picture and their degree of damage by comparing with massive historical databases to obtain a similar picture. However, the accuracy of damage identification in such a way is not ideal.

In addition, some target detection models are trained by means of sample labeling. These target detection models are trained to detect vehicle damage as a detection object for damage identification. Reflection and stain interference are two major hindrances in the process of damage identification. In the result of the identification, the true damage is often detected correctly, and at the same time, a few reflections or stains are detected as damage, and thus false detection occurs.

Figure 1:
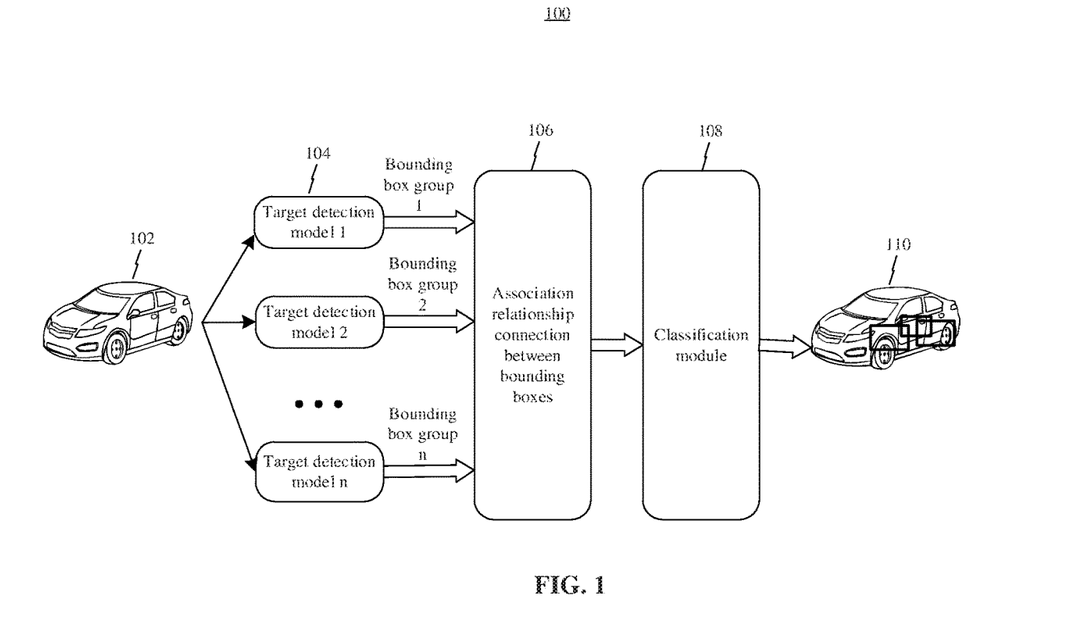
FIG. 1 is a schematic diagram of a method for vehicle damage identification according to an embodiment.

FIG. 1 is a schematic diagram of a method 100 for vehicle damage identification according to an embodiment. Referring to FIG. 1, according to the method 100, a vehicle damage picture is obtained (102). The vehicle damage picture is then respectively input to a plurality of target detection models including, e.g., a target detection model 1 to a target detection model n, where n is a natural number greater than 1 (104). Each of the plurality of target detection models independently performs damage identification and outputs a damage detection result. For example, the damage detection result includes a group of identified damage bounding boxes and corresponding category prediction results. Then, multiple groups of damage bounding boxes (e.g., bounding box group 1 to bounding box group n) output by the plurality of target detection models are used as candidate bounding boxes, and an association relationship between the candidate bounding boxes is determined (106), thereby establishing a connection between the candidate bounding boxes. In an embodiment, the association relationship may include one or more of the following: an association relationship about a bounding box content, an association relationship about a location, and an association relationship about category prediction results. Based on such associations, a trained classification model is used to optimize the damage detection results (108) to obtain damage detection results (110). An example implementation process of optimizing the damage detection results is described below.

Figure 2:
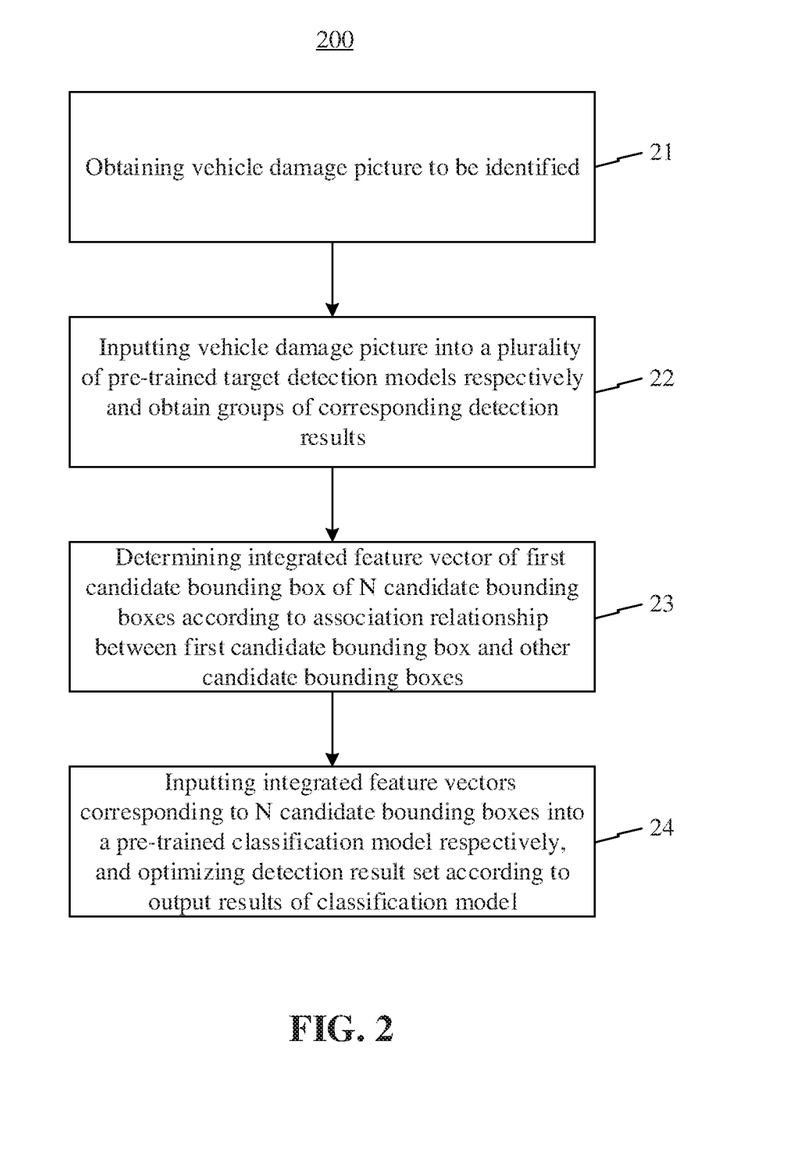
FIG. 2 is a flow chart of a method for vehicle damage identification according to an embodiment.

FIG. 2 is a flow chart of a method 200 for vehicle damage identification according to an embodiment. The method 200 may be performed by any apparatus, device, platform, and device cluster having computing and processing capabilities. Referring to FIG. 2, the method 200 includes: a step 21 of obtaining a vehicle damage picture to be identified; a step 22 of inputting the vehicle damage picture into a plurality of pre-trained target detection models respectively, and obtaining groups of corresponding detection results from the plurality of target detection models, wherein the groups of detection results constitute a detection result set including N candidate bounding boxes detected by the plurality of target detection models and category prediction results of the candidate bounding boxes; a step 23 of determining, for any first candidate bounding box of the N candidate bounding boxes, an integrated feature vector of the first candidate bounding box according to at least an association relationship between the first candidate bounding box and other candidate bounding boxes, wherein the association relationship includes at least one of: a bounding box content association relationship, a location association relationship, or a category prediction result association relationship; and a step 24 of separately inputting the integrated feature vectors corresponding to the N candidate bounding boxes into a pre-trained classification model, and optimizing the detection result set according to output results of the classification model. The manner in which the above various steps are performed will be described below.

First, in step 21, a vehicle damage picture is obtained. The vehicle damage picture may be a picture of a vehicle damage scene taken by an ordinary user and subject to damage identification.

Figure 3A:
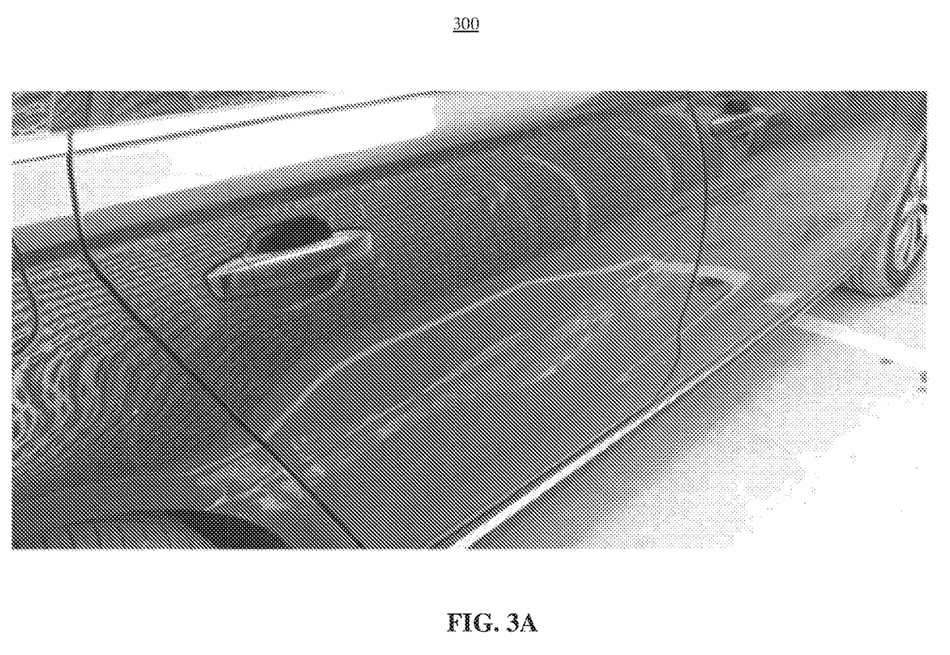
FIG. 3A is an example of a vehicle damage picture according to an embodiment.

FIG. 3A is an example of a vehicle damage picture 300 according to an embodiment. Referring to FIG. 3A, the vehicle damage picture 300 may be an unprocessed on-site picture taken by an ordinary user.

Referring back to FIG. 2, in step 22, the vehicle damage picture is input into a plurality of pre-trained target detection models respectively, and groups of corresponding detection results are obtained from the plurality of target detection models.

The target detection models are used to identify a specific target object from the vehicle damage picture and classify the target object. In order to identify the vehicle damage by using target detection models, a large number of pictures labeled with damage objects may be used as training samples to train the target detection models, so that the trained target detection models may be used to identify damage objects from the vehicle damage picture.

Various target detection models may be provided based on various network structures and various detection algorithms. For example, a one-stage detection model may directly determine the category probability and position coordinates of a target object from a picture, for example, it may directly identify the target object. Typical examples of one-stage detection models include Single Shot Detector (SSD) models and You Only Look Once (YOLO) models. Also for example, a two-stage detection model first generates a candidate region, also called a region of interest (ROI), in the picture, and then performs target identification and bounding box regression in the candidate region. Typical examples of two-stage detection models include Region-Convolutional Neural Network (R-CNN) models, Fast R-CNN models, Faster R-CNN models, and so on. Other target detection models may be provided.

A plurality of target detection models may be selected from the various target detection models mentioned above, and target detection is performed on the vehicle damage picture in step 22. The selected plurality of target detection models may each conduct detection on the vehicle damage picture in parallel and independently.

Each of the target detection models may output a group of detection results. For example, the detection results output by a target detection model include a bounding box containing a target object and a category of the target object in the bounding box. When a target detection algorithm is applied to damage identification, a region bounding box of a damage object and a damage category of the damage object are obtained. The plurality of target detection models output groups of corresponding detection results, and the groups of detection results constitute a detection result set. Therefore, the detection result set includes a total of N damage bounding boxes detected by the plurality of target detection models, and corresponding damage category predictions.

Figure 3B:
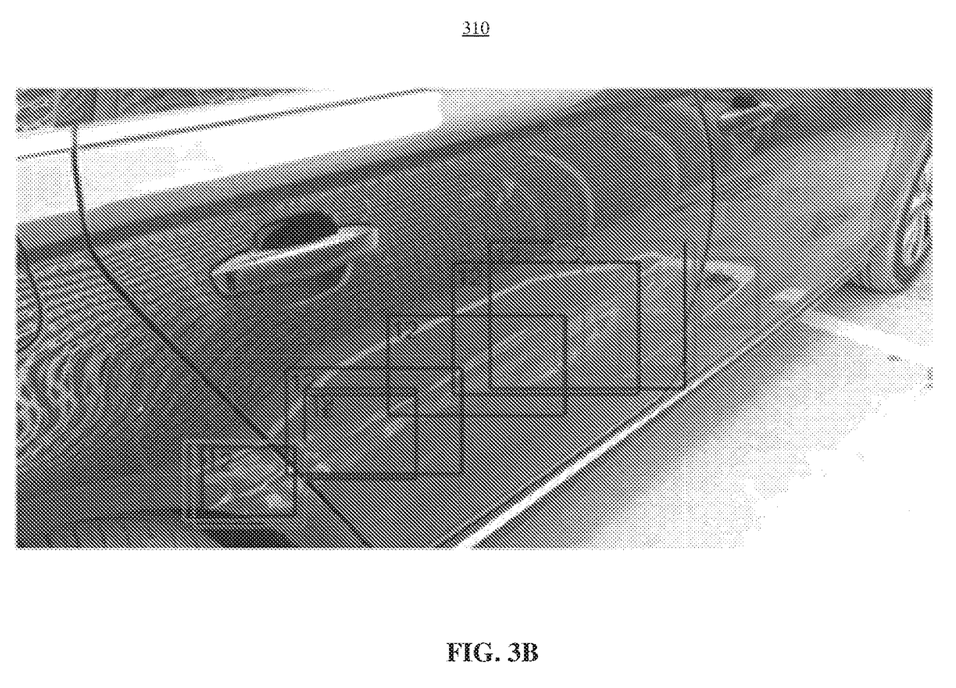
FIG. 3B is an example of a plurality of candidate bounding boxes respectively detected by a plurality of target detection models according to an embodiment.

FIG. 3B is an example of a plurality of candidate bounding boxes respectively detected by a plurality of target detection models according to an embodiment. Referring to FIG. 3B, a detection result set 310 includes a plurality of damage bounding boxes and corresponding damage categories (the number at the upper left corner of each bounding box) output by the plurality of target detection models.

Next, the damage bounding boxes detected by the target detection models are used as candidate bounding boxes, and the N candidate bounding boxes are further optimized.

Referring back to FIG. 2, in step 23, for the N candidate bounding boxes, an association relationship between each candidate bounding box and other candidate bounding boxes is determined, thereby establishing connections among the bounding boxes for optimizing the results. An example of a candidate bounding box, referred to herein as a first candidate bounding box, is described below. The first candidate bounding box here can be any one of the N candidate bounding boxes, wherein the wording "first" is only for differentiation, and has no other limiting effect.

For any first candidate bounding box, in step 23, an integrated feature vector of the first candidate bounding box is determined according to the association relationship between the first candidate bounding box and other candidate bounding boxes. In one embodiment, the integrated feature vector of the first candidate bounding box includes a first part and a second part, the first part is a feature part associated only with the candidate bounding box itself, and the second part is a feature part obtained on the basis of the association relationship with other candidate bounding boxes. In another embodiment, the integrated feature vector may include the second part only.

The association relationship may be an association relationship about the content of the bounding box, an association relationship about the location of the bounding box, or an association relationship about the category prediction result of the bounding box.

For example, in one embodiment, the association relationship may include a bounding box content association relationship, that is, an association relationship between image features within bounding boxes. In such a case, the association relationship in content between the first candidate bounding box and the other candidate bounding boxes may be determined, and the integrated feature vector of the first candidate bounding box is determined accordingly. In an embodiment, the other candidate bounding boxes include a second candidate bounding box, and the first candidate bounding box and the second candidate bounding box are used as an example below to describe the manner in which step 23 is performed.

Figure 4:
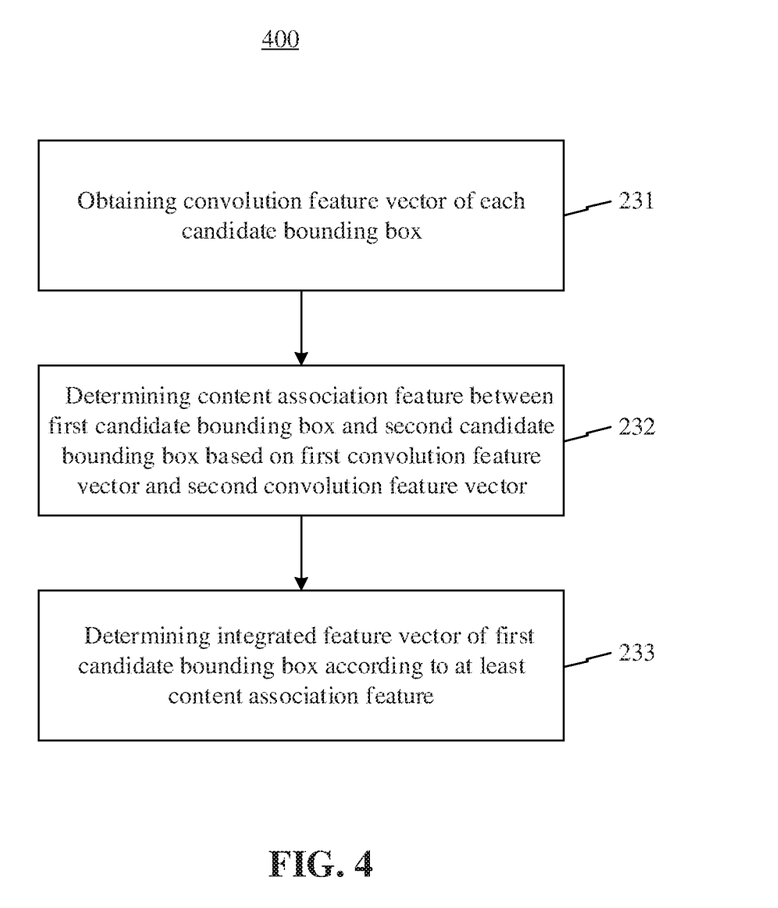
FIG. 4 is a flowchart of a method for determining an integrated feature vector according to an embodiment.

FIG. 4 is a flowchart of a method 400 for determining an integrated feature vector according to an embodiment. For example, the steps of FIG. 4 may be the detailed operations of the step 23 of FIG. 2. Referring to FIG. 4, the method 400 includes a step 231 of obtaining a convolution feature vector of each candidate bounding box. The convolution feature vector is used to represent the picture content feature in a corresponding bounding box.

In an embodiment, the target detection model may be a convolutional neural network (CNN) based model. In a CNN based model, a convolution processing is first performed on the to-be-identified picture to obtain a convolution feature map, which reflects the abstract feature of the picture content. Then a target classification and a bounding box regression are performed based on the convolution feature map. Accordingly, each of the N candidate bounding boxes output by the target detection models may correspond to a sub-region in the convolution feature map. By performing feature extraction on each sub-region, a convolution feature vector corresponding to each candidate bounding box may be obtained. For example, the first candidate bounding box may correspond to a first convolution feature vector $F1$ and the second candidate bounding box may correspond to a second convolution feature vector $F2$.

Next, in step 232, based on the first convolution feature vector $F1$ and the second convolution feature vector $F2$, an association feature $A_{1-2}$ between the first candidate bounding box and the second candidate bounding box with respect to the picture content is determined.

In one embodiment, a difference between the first convolution feature vector $F1$ and the second convolution feature vector $F2$ may be calculated, and based on the difference, the association feature $A_{1-2}$ between the first candidate bounding box and the second candidate bounding box with respect to the picture content is determined.

In an embodiment, a dot product between the first convolution feature vector $F1$ and the second convolution feature vector $F2$ may be calculated, and based on the dot product, the association feature $A_{1-2}$ between the first candidate bounding box and the second candidate bounding box with respect to the picture content is determined.

For example, assuming that $F1=(a1, a2, \ldots, an)$; $F2=(b1, b2, \ldots, bn)$, according to the above example, the content association feature $A_{1-2}$ may be defined as:

$$A_{1-2}=(a1*b1, a2*b2, \ldots, an*bn).$$

Thus, the calculated content association feature $A_{1-2}$ is a vector.

In an embodiment, a dot product between F1 and F2 may be calculated, and based on the dot product, the association feature $A_{1-2}$ between the first candidate bounding box and the second candidate bounding box with respect to the picture content is determined as $A_{1-2}$=a1*b1+a2*b2+ . . . +an*bn. Thus, the calculated content association feature $A_{1-2}$ is a scalar.

In an embodiment, a distance D between the first convolution feature vector F1 and the second convolution feature vector F2 may be calculated, and based on the distance D, the content association feature is determined. For example, the cosine distance or Euclidean distance between F1 and F2 may be calculated as the distance D.

In an embodiment, other mathematical operations may also be performed on the basis of the two convolution feature vectors to obtain a corresponding association feature between the first candidate bounding box and the second candidate bounding box with respect to the picture content.

Then, in step 233, the integrated feature vector of the first candidate bounding box is determined according to at least the content association feature $A_{1-2}$. The content association feature $A_{1-2}$ represents the similarity in content between the first candidate bounding box and a certain non-specific other candidate bounding box (the second candidate bounding box). When the content association feature is a vector, it may be used as a part of the integrated feature vector of the first candidate bounding box; when the content association feature is a scalar, it may be used as a vector element of the integrated feature vector of the first candidate bounding box.

The process of calculating the content association feature is described above in connection with a certain other candidate bounding box (the second candidate bounding box). The process may be applied to calculating a content association feature between the first candidate bounding box and any of the other candidate bounding boxes.

As described above, in addition to the association with respect to the picture content, the association relationship between bounding boxes may also include a location association relationship. The following description takes the first candidate bounding box and the second candidate bounding box as an example.

In an embodiment, in order to determine the integrated feature vector of the first candidate bounding box, a location parameter of the first candidate bounding box and a location parameter of the second candidate bounding box are first obtained. The detection results output by the target detection models may include a location parameter of each candidate bounding box. For example, a location parameter of a candidate bounding box may be in the form of (x, y, w, h), where (x, y) represents the center coordinates of the candidate bounding box, w represents a width of the bounding box, and h represents a height of the bounding box. Therefore, the location parameter of the first candidate bounding box and the location parameter of the second candidate bounding box may be easily extracted from the detection result set.

Then, a location association feature between the first candidate bounding box and the second candidate bounding box is determined on the basis of the location parameter of the first candidate bounding box and the location parameter of the second candidate bounding box.

In an embodiment, the location association feature includes one or more of the following: a center-to-center distance, an intersection over union (IoU) ratio, an area ratio, an inclusion relationship, and so on. Here, the IoU ratio represents a ratio of the area of overlap of two candidate bounding boxes to the area of union of the two candidate bounding boxes; the inclusion relationship may be that the first candidate bounding box includes/excludes the second candidate bounding box, or the second candidate bounding box includes/excludes the first candidate bounding box, and so on.

The integrated feature vector of the first candidate bounding box is then determined according to at least the location association feature. Similarly, the location association feature, determined as above, between the first candidate bounding box and the second candidate bounding box may be used as a part of the vector element of the integrated feature vector of the first candidate bounding box.

The process of calculating the location association feature described above in connection with a certain other candidate bounding box (the second candidate bounding box) may be applicable to calculating a location association feature between the first candidate bounding box and any of the other candidate bounding boxes.

In an embodiment, the association relationship between bounding boxes may include a category prediction result association relationship. The following description takes the first candidate bounding box and the second candidate bounding box as an example.

In the embodiment, in order to determine the integrated feature vector of the first candidate bounding box, firstly, the category prediction results of the first candidate bounding box and the second candidate bounding box are obtained and respectively denoted as a first prediction result and a second prediction result, and based on the first prediction result and the second prediction result, a prediction result association feature between the first candidate bounding box and the second candidate bounding box is determined.

The category prediction result may include a predicted target category. For example, in FIG. 3B, there is a number at the upper left corner of each candidate bounding box indicating the predicted target category, such as 12, indicating scratch damage. Other numbers indicate other types of damage. Correspondingly, the first prediction result includes a first category, and the second prediction result includes a second category; and the prediction result association feature determined based on this may include a comparison result of the first category and the second category, e.g., "the same" or "different".

In some cases, the predicted target categories are organized in a hierarchical structure. For example, category A refers to a scratch, where A1, A2, and A3 represent mild, medium, and severe scratches, respectively. In this case, the prediction result association feature between the first candidate bounding box and the second candidate bounding box may further include an upper category to which both the first category and the second category belong.

In an embodiment, the target detection models also output predicted confidences together with the predicted categories of the candidate bounding boxes. For example, the first prediction result includes a first category and a first confidence, and the second prediction result includes a second category and a second confidence. In such a case, the prediction result association feature between the first candidate bounding box and the second candidate bounding box may include the likeness or unlikeness of the first category and the second category, and a difference between the first confidence and the second confidence.

The process of calculating an association feature is described above in connection with the first candidate bounding box and a specific other candidate bounding box (the second candidate bounding box), and the association feature may include one or more of a content association feature, a location association features, and a prediction result association feature. Such an association feature may be used as a basis for determining the integrated feature vector of the first candidate bounding box.

With regard to the other candidate bounding boxes described above, different options are also possible in different embodiments. In an embodiment, for the first candidate bounding box, an association relationship between the first candidate bounding box and each of the other candidate bounding boxes of the N candidate bounding boxes may be separately determined, based on which the integrated feature vector is determined. For example, four target detection models are used and a total of 100 candidate bounding boxes (N=100) are detected. Then, for any first candidate bounding box among the detected candidate bounding boxes, for example, candidate bounding box 1, 99 groups of association features between the candidate bounding box and the other 99 candidate bounding boxes can be separately calculated, and the 99 groups of association features are joined or integrated together to obtain an integrated feature vector of the first candidate bounding box.

In an embodiment, in order to make obtained integrated feature vectors have the same length, the association features may be counted and combined after separately calculating each group of association features with respect to each of the other candidate bounding boxes. For example, an average value of each group of association features is calculated, and a maximum value and a minimum value are obtained, etc., and these statistical values are used as vector elements of the integrated feature vector.

In an embodiment, a part of all other candidate bounding boxes may be selected to calculate the association features. In one example, candidate bounding boxes having a center-to-center distance from the first candidate bounding box falling within a predetermined threshold are selected, and association features between these candidate bounding boxes and the first candidate bounding box are then calculated. In another example, a predetermined number of candidate bounding boxes ranked based on a center-to-center distance from the first candidate bounding box are selected. For example, a predetermined number (e.g., 10) of candidate bounding boxes having the closest center-to-center distances from the first candidate bounding box are selected, and association features between these candidate bounding boxes and the first candidate bounding box are then calculated. In this way, only the association relationship between the first candidate bounding box and some candidate bounding boxes around it is considered, and the candidate bounding boxes which are far away are ignored, thereby reducing the calculation amount and improving efficiency.

As described above, the integrated feature vector of the first candidate bounding box is determined according to the association relationship between the first candidate bounding box and the other candidate bounding boxes. It can be understood that, for each of the N candidate bounding boxes, the above-described process may be performed, so that the integrated feature vector corresponding to each candidate bounding box is obtained.

Referring back to FIG. 2, in step 24, the integrated feature vectors corresponding to the candidate bounding boxes are separately input into a pre-trained classification model, and the detection result set is optimized according to output results of the classification model.

The classification model may implement classification prediction by using multiple model structures and model algorithms. For example, the classification model may be a Gradient Boosting Decision Tree (GBDT) model, a Support Vector Machine (SVM) model, a Deep Neural Network (DNN) based model, or the like.

In an embodiment, the classification model is pre-trained by positive samples including, for example, a plurality of damage regions labeled as true damage, and negative samples including a plurality of damage regions labeled as true damage and at least one region labeled as non-damage, so that the classification model learns, from the positive samples, the characteristics of the association features among the multiple true damage regions, and learns, from the negative samples, characteristics of the association features between the non-damage region and the true damage regions.

As described above, in step 22, a plurality of target detection models are used to identify the vehicle damage picture to obtain preliminary detection results. These target detections also require the use of a large number of labeled pictures as a training sample set for training. These labeled pictures may be manually labeled to indicate true damage objects. The training sample set may also include some negative samples, that is, pictures of non-damage regions. Therefore, the classification model may reuse the training sample set for training, for example, obtain therefrom a plurality of damage regions labeled as true damage as positive samples, obtain a plurality of damage regions labeled as true damage and at least one region labeled as non-damage as negative samples, and the classification model is trained by using the positive and negative samples. This is suitable for the training of a two-category model.

The trained classification model performs classification prediction on a corresponding candidate bounding box based on the input integrated feature vector. In an embodiment, the classification result may be a two-category result, for example, whether the corresponding candidate bounding box is a true and accurate damage bounding box. In an embodiment, the classification result may also be a multi-category result. For example, category 1 corresponds to bounding box location and damage category prediction being both accurate, category 2 corresponds to the bounding box including damage but the damage category prediction being inaccurate, and category 3 corresponds to a non-damage bounding box, and so on. Based on the output result of the classification model, the detection results may be optimized.

In an embodiment, if the classification result indicates that the damage category prediction of a candidate bounding box is inaccurate (for example, corresponding to category 2 in the multi-category result), the candidate bounding box may be labeled as a pending region and then sent to a manual platform for re-checking.

In an embodiment, a further model algorithm may be employed to correct the candidate bounding box that is inaccurately predicted. For example, the prediction result of the candidate bounding box is corrected by referring to a prediction result of another candidate bounding box closest to the candidate bounding box and having an accurate prediction indicated by a classification result. For example, the center-to-center distances between candidate bounding box 1 and candidate bounding boxes 2, 3 and 4 are within a preset range, and the distances are relatively close. The damage category prediction results of candidate bounding boxes 2, 3, and 4 are all category 12-scratch damage, and the classification results of the candidate bounding boxes, given by the classification model, indicate that the prediction results are accurate. However, the prediction result of candidate bounding box 1 is category 11-deformation, and the classification result of the candidate bounding box, given by the classification model, indicates the prediction result is inaccurate. Considering the continuity of the damage object, the prediction result of the candidate bounding box 1 may be corrected by referring to the prediction results of candidate bounding boxes 2, 3 and 4, thereby optimizing the detection result set.

In an embodiment, the classification result output by the classification model based on the integrated feature vector of the first candidate bounding box indicates that the first candidate bounding box is an abnormal bounding box, i.e., not a true and accurate damage bounding box. Then, the first candidate bounding box may be removed from the detection result set to optimize the damage detection results.

In an embodiment, for the multiple candidate bounding boxes shown in FIG. 3B, according to step 23 to step 24 of FIG. 2, the association features between each candidate bounding box and other candidate bounding boxes are calculated and input into the classification model to determine the accuracy of the detection results of the candidate bounding boxes.

Figure 3C:
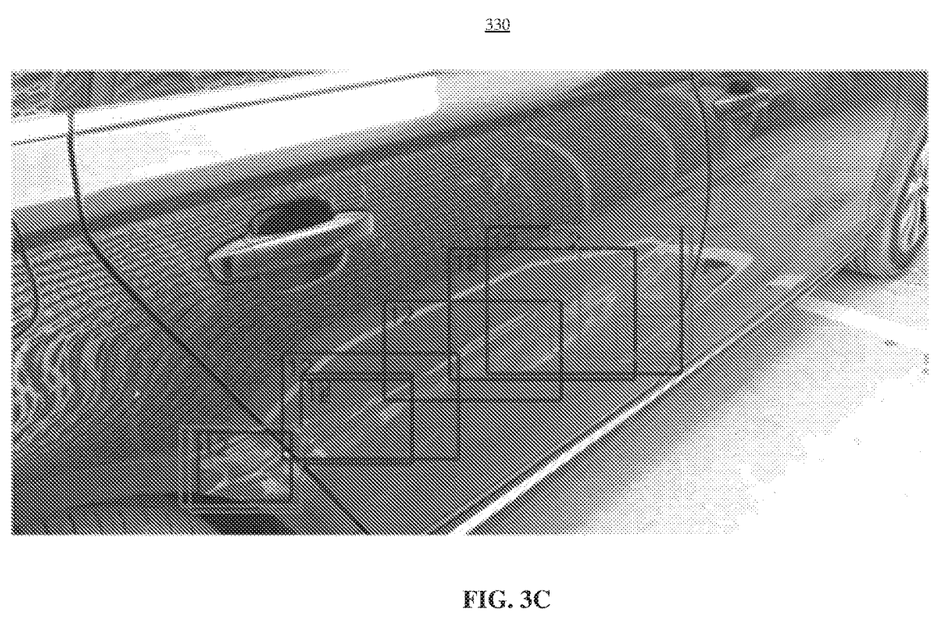
FIG. 3C is an example of optimized detection results according to an embodiment.

FIG. 3C is an example of optimized detection results according to an embodiment. Assuming that the classification model output in FIG. 3B shows that the rightmost candidate bounding box is an abnormal bounding box, the rightmost candidate bounding box is removed from the detection results and optimized damage detection results 330 are obtained, as shown in FIG. 3C. For example, the rightmost candidate bounding box in FIG. 3B is light reflected from the ground, while the other candidate bounding boxes contain continuous scratches. Therefore, the association relationship with other candidate bounding boxes, calculated for the rightmost candidate bounding box, exhibits abnormal features, which are then embodied in the integrated feature vector. Thus, based on the integrated feature vector, the classification model gives a classification result that the candidate bounding box is abnormal.

In the above-described damage identification process, multiple target detection models are used at the same time to perform damage identification and detection on a vehicle damage picture, which makes generated detection results complement each other, and therefore reduces the possibility of missed detection to the greatest extent. Further, for the N candidate bounding boxes obtained by the plurality of target detection models, based on the association relationship between each candidate bounding box and other candidate bounding boxes, connections are established among the candidate bounding boxes, and based on such connection results, a trained model is further used to determine the accuracy of each candidate bounding box, thereby eliminating bounding boxes of false detection and further optimizing the damage identification results. In this way, the accuracy of damage identification can be comprehensively improved.

Figure 5:
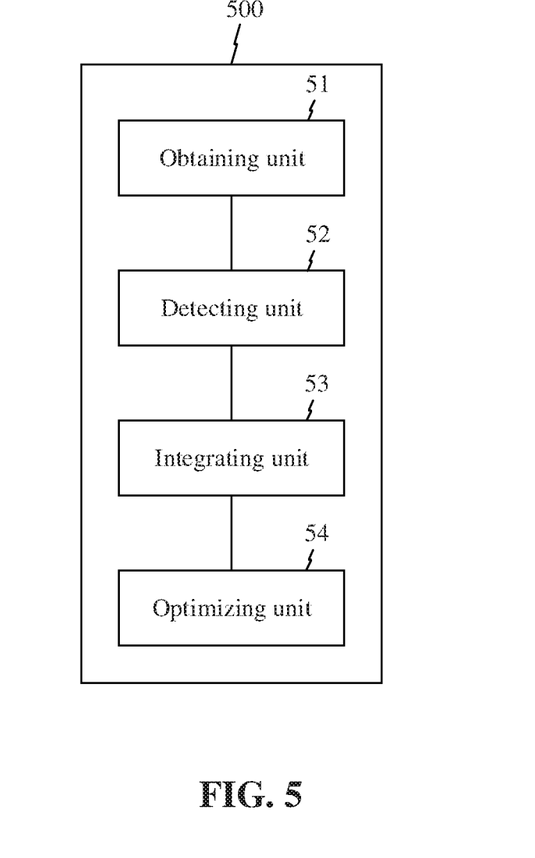
FIG. 5 is a block diagram of an apparatus for vehicle damage identification according to an embodiment.

FIG. 5 is a block diagram of an apparatus 500 for vehicle damage identification according to an embodiment. The apparatus 500 may be implemented in any apparatus, device, platform, and device cluster having computing and processing capabilities. Referring to FIG. 5, the apparatus 500 includes an obtaining unit 51 configured to obtain a vehicle damage picture to be identified; a detecting unit 52 configured to input the vehicle damage picture into a plurality of pre-trained target detection models respectively, and obtain groups of corresponding detection results from the plurality of target detection models, wherein the groups of detection results constitute a detection result set including N candidate bounding boxes detected by the plurality of target detection models and category prediction results of the candidate bounding boxes; an integrating unit 53 configured to, for any first candidate bounding box of the N candidate bounding boxes, determine an integrated feature vector of the first candidate bounding box according to at least an association relationship between the first candidate bounding box and other candidate bounding boxes, wherein the association relationship includes at least one of the following: a bounding box content association relationship, a location association relationship, or a category prediction result association relationship; and an optimizing unit 54 configured to separately input the integrated feature vectors corresponding to the candidate bounding boxes into a pre-trained classification model, and optimize the detection result set according to output results of the classification model.

The following description is made in conjunction with the embodiments in which the other candidate bounding boxes include a second candidate bounding box.

According to an embodiment, the association relationship includes a bounding box content association relationship. In such a case, the integrating unit 54 may further include (not shown): a convolution feature obtaining module configured to obtain a convolution feature vector of each candidate bounding box, wherein the convolution feature vector is used to represent a picture content feature in a corresponding bounding box; an association feature determining module configured to determine a content association feature between the first candidate bounding box and the second candidate bounding box based on a first convolution feature vector corresponding to the first candidate bounding box and a second convolution feature vector corresponding to the second candidate bounding box; and an integrated feature determining module configured to determine an integrated feature vector of the first candidate bounding box according to at least the content association feature.

In an embodiment, the association feature determining module may be configured to perform at least one of the following: calculating a dot product of the first convolution feature vector and the second convolution feature vector, and determining the content association feature based on the dot product; and calculating a distance between the first convolution feature vector and the second convolution feature vector, and determining the content association feature based on the distance, wherein the distance includes a cosine distance or a Euclidean distance.

According to an embodiment, the association relationship includes a location association relationship. In such a case, the integrating unit 53 may be configured to: determine a location association feature between the first candidate bounding box and the second candidate bounding box based on a location parameter of the first candidate bounding box and a location parameter of the second candidate bounding box; and determine, according to at least the location association feature, the integrated feature vector of the first candidate bounding box.

In an embodiment, the location association feature includes one or more of the following: a center-to-center distance, an IoU (Intersection-over-Union) ratio, an area ratio, and an inclusion relationship.

According to an embodiment, the association relationship includes a category prediction result association relationship. In such a case, the integrating unit 53 may be configured to: determine a prediction result association feature between the first candidate bounding box and the second candidate bounding box based on a first prediction result corresponding to the first candidate bounding box and a second prediction result corresponding to the second candidate bounding box; and determine, according to the prediction result association feature, the integrated feature vector of the first candidate bounding box.

In an embodiment, the first prediction result includes a first category and a first confidence, the second prediction result includes a second category and a second confidence, and the prediction result association feature includes: whether the first category is the same as the second category, and a difference between the first confidence and the second confidence.

In an embodiment, the other candidate bounding boxes include one or more of the following: candidate bounding boxes having a center-to-center distance from the first candidate bounding box falling within a predetermined threshold, and candidate bounding boxes having a center-to-center distance from the first candidate bounding box ranked within a predetermined number.

In an embodiment, the classification model includes one of the following: a GBDT model, an SVM model, and a DNN based classification model.

In an embodiment, the optimizing unit 54 is configured to remove the first candidate bounding box from the detection result set when the output result of the classification model for the first candidate bounding box is an abnormal bounding box.

In this way, vehicle damage can be efficiently and accurately identified through the apparatus 500.

According to an embodiment, a computer-readable storage medium is provided. The computer-readable storage medium stores a computer program for causing a computer to perform the method as illustrated in FIG. 2 when the computer program is executed in a computer.

According to an embodiment, a computing device is provided. The computing device includes a memory and a processor, wherein the memory stores executable codes, and when the processor executes the executable codes, the method as illustrated in FIG. 2 is performed.

Those skilled in the art should appreciate that in one or more examples described above, the functions described may be implemented by hardware, software, firmware, or any combination thereof. When implemented by software, the functions may be stored in a computer-readable medium or transmitted as one or more instructions or codes on a computer-readable medium.

Although the specification has been described in conjunction with specific embodiments, may alternatives, modifications and variations will be apparent to those skilled in the art. Accordingly, the following claims embrace all such alternatives, modifications and variations that fall within the terms of the claims.

The invention claimed is:

1. A method for vehicle damage identification, comprising:
obtaining a vehicle damage picture to be identified;
inputting the vehicle damage picture into a plurality of pre-trained target detection models respectively, and obtaining corresponding detection results from the plurality of pre-trained target detection models as a detection result set, wherein the detection result set comprises candidate bounding boxes detected by the plurality of pre-trained target detection models and category prediction results of the candidate bounding boxes;
determining an integrated feature vector of a first candidate bounding box of the candidate bounding boxes based on an association relationship between the first candidate bounding box and other candidate bounding boxes, wherein the association relationship includes at least one of: a bounding box content association relationship, a location association relationship, or a category prediction result association relationship; and
separately inputting integrated feature vectors corresponding to the candidate bounding boxes into a pre-trained classification model, and optimizing the detection result set according to output results of the pre-trained classification model.

2. The method according to claim 1, wherein the other candidate bounding boxes include a second candidate bounding box, and the association relationship includes a bounding box content association relationship; and
determining the integrated feature vector of the first candidate bounding box comprises:
obtaining a convolution feature vector of each of the candidate bounding boxes, wherein the convolution feature vector represents a picture content feature in a corresponding bounding box;
determining a content association feature between the first candidate bounding box and the second candidate bounding box based on a first convolution feature vector corresponding to the first candidate bounding box and a second convolution feature vector corresponding to the second candidate bounding box; and
determining, based on the content association feature, the integrated feature vector of the first candidate bounding box.

3. The method according to claim 2, wherein determining the content association feature between the first candidate bounding box and the second candidate bounding box comprises at least one of:
calculating a dot product of the first convolution feature vector and the second convolution feature vector, and determining the content association feature based on the dot product; or
calculating a distance between the first convolution feature vector and the second convolution feature vector, and determining the content association feature based on the distance, wherein the distance includes a cosine distance or a Euclidean distance.

4. The method according to claim 1, wherein the other candidate bounding boxes include a second candidate bounding box, and the association relationship includes a location association relationship; and
determining the integrated feature vector of the first candidate bounding box comprises:
determining a location association feature between the first candidate bounding box and the second candidate bounding box based on a location parameter of the first candidate bounding box and a location parameter of the second candidate bounding box; and
determining, based on the location association feature, the integrated feature vector of the first candidate bounding box.

5. The method according to claim 4, wherein the location association feature includes at least one of: a center-to-center distance, an intersection-over-union (IoU) ratio, an area ratio, or an inclusion relationship.

6. The method according to claim 1, wherein the other candidate bounding boxes include a second candidate bounding box, and the association relationship includes a category prediction result association relationship; and
determining the integrated feature vector of the first candidate bounding box comprises:

determining a prediction result association feature between the first candidate bounding box and the second candidate bounding box based on a first prediction result corresponding to the first candidate bounding box and a second prediction result corresponding to the second candidate bounding box; and determining, based on the prediction result association feature, the integrated feature vector of the first candidate bounding box.

7. The method according to claim 6, wherein the first prediction result includes a first category and a first confidence, the second prediction result includes a second category and a second confidence, and the prediction result association feature includes: whether the first category is the same as the second category, and a difference between the first confidence and the second confidence.

8. The method according to claim 1, wherein the other candidate bounding boxes include at least one of: candidate bounding boxes having a center-to-center distance from the first candidate bounding box falling within a predetermined threshold, or a predetermined number of candidate bounding boxes ranked based on a center-to-center distance from the first candidate bounding box.

9. The method according to claim 1, wherein the pre-trained classification model includes at least one of: a Gradient Boosting Decision Tree (GBDT) model, a Support Vector Machine (SVM) model, or a Deep Neural Network (DNN) based classification model.

10. The method according to claim 1, wherein optimizing the detection result set according to output results of the pre-trained classification model comprises:
removing the first candidate bounding box from the detection result set when an output result of the pre-trained classification model for the first candidate bounding box is an abnormal bounding box.

11. An apparatus for vehicle damage identification, comprising:
a processor; and
a memory configured to store instructions, wherein the processor is configured to execute the instructions to:
obtain a vehicle damage picture to be identified;
input the vehicle damage picture into a plurality of pre-trained target detection models respectively, and obtain corresponding detection results from the plurality of pre-trained target detection models as a detection result set, wherein the detection result set comprises candidate bounding boxes detected by the plurality of pre-trained target detection models and category prediction results of the candidate bounding boxes;
determine an integrated feature vector of a first candidate bounding box of the candidate bounding boxes according to an association relationship between the first candidate bounding box and other candidate bounding boxes, wherein the association relationship includes at least one of: a bounding box content association relationship, a location association relationship, or a category prediction result association relationship; and
separately input integrated feature vectors corresponding to the candidate bounding boxes into a pre-trained classification model, and optimize the detection result set according to output results of the pre-trained classification model.

12. The apparatus according to claim 11, wherein the other candidate bounding boxes include a second candidate bounding box, and the association relationship includes a bounding box content association relationship; and
the processor is further configured to execute the instructions to:
obtain a convolution feature vector of each of the candidate bounding boxes, wherein the convolution feature vector represents a picture content feature in a corresponding bounding box;
determine a content association feature between the first candidate bounding box and the second candidate bounding box based on a first convolution feature vector corresponding to the first candidate bounding box and a second convolution feature vector corresponding to the second candidate bounding box; and
determine an integrated feature vector of the first candidate bounding box based on the content association feature.

13. The apparatus according to claim 12, wherein the processor is further configured to execute the instructions to perform at least one of:
calculating a dot product of the first convolution feature vector and the second convolution feature vector, and determining the content association feature based on the dot product; or
calculating a distance between the first convolution feature vector and the second convolution feature vector, and determining the content association feature based on the distance, wherein the distance includes a cosine distance or a Euclidean distance.

14. The apparatus according to claim 11, wherein the other candidate bounding boxes include a second candidate bounding box, and the association relationship includes a location association relationship; and
the processor is further configured to execute the instructions to:
determine a location association feature between the first candidate bounding box and the second candidate bounding box based on a location parameter of the first candidate bounding box and a location parameter of the second candidate bounding box; and
determine, based on the location association feature, the integrated feature vector of the first candidate bounding box.

15. The apparatus according to claim 14, wherein the location association feature includes at least one of: a center-to-center distance, an IoU ratio, an area ratio, or an inclusion relationship.

16. The apparatus according to claim 11, wherein the other candidate bounding boxes include a second candidate bounding box, and the association relationship includes a category prediction result association relationship; and
the processor is further configured to execute the instructions to:
determine a prediction result association feature between the first candidate bounding box and the second candidate bounding box based on a first prediction result corresponding to the first candidate bounding box and a second prediction result corresponding to the second candidate bounding box; and
determine, based on the prediction result association feature, the integrated feature vector of the first candidate bounding box.

17. The apparatus according to claim 16, wherein the first prediction result includes a first category and a first confidence, the second prediction result includes a second category and a second confidence, and the prediction result association feature includes: whether the first category is the same as the second category, and a difference between the first confidence and the second confidence.

18. The apparatus according to claim 11, wherein the other candidate bounding boxes include at least one of: candidate bounding boxes having a center-to-center distance from the first candidate bounding box falling within a predetermined threshold, or a predetermined number of candidate bounding boxes ranked based on a center-to-center distance from the first candidate bounding box.

19. The apparatus according to claim 11, wherein the processor is further configured to execute the instructions to:
remove the first candidate bounding box from the detection result set when an output result of the pre-trained classification model for the first candidate bounding box is an abnormal bounding box.

20. A non-transitory computer-readable medium having stored therein instructions that, when executed by a processor of a device, cause the device to perform a method for vehicle damage identification, the method comprising:
obtaining a vehicle damage picture to be identified;
inputting the vehicle damage picture into a plurality of pre-trained target detection models respectively, and obtaining corresponding detection results from the plurality of pre-trained target detection models as a detection result set, wherein the detection result set comprises candidate bounding boxes detected by the plurality of pre-trained target detection models and category prediction results of the candidate bounding boxes;
determining an integrated feature vector of a first candidate bounding box of the candidate bounding boxes based on an association relationship between the first candidate bounding box and other candidate bounding boxes, wherein the association relationship includes at least one of: a bounding box content association relationship, a location association relationship, or a category prediction result association relationship; and
separately inputting integrated feature vectors corresponding to the candidate bounding boxes into a pre-trained classification model, and optimizing the detection result set according to output results of the pre-trained classification model.

* * * * *